(12) United States Patent
Liu et al.

(10) Patent No.: US 11,882,378 B2
(45) Date of Patent: Jan. 23, 2024

(54) IMAGING METHODS USING MULTIPLE RADIATION BEAMS

(71) Applicant: SHENZHEN XPECTVISION TECHNOLOGY CO., LTD., Shenzhen (CN)

(72) Inventors: Yurun Liu, Shenzhen (CN); Peiyan Cao, Shenzhen (CN)

(73) Assignee: SHENZHEN XPECTVISION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/211,769

(22) Filed: Jun. 20, 2023

(65) Prior Publication Data

US 2023/0353699 A1    Nov. 2, 2023

Related U.S. Application Data

(63) Continuation of application No. PCT/CN2021/071004, filed on Jan. 11, 2021.

(51) Int. Cl.
  *H04N 5/262*  (2006.01)
  *H04N 25/30*  (2023.01)
  *G01T 1/24*   (2006.01)

(52) U.S. Cl.
  CPC ........... *H04N 5/2624* (2013.01); *G01T 1/247* (2013.01); *H04N 25/30* (2023.01); *G06T 2207/10116* (2013.01)

(58) Field of Classification Search
  None
  See application file for complete search history.

(56) References Cited

U.S. PATENT DOCUMENTS

| 5,574,492 A | 11/1996 | Suzuki |
| 2015/0016592 A1* | 1/2015 | Takagi ................. A61B 6/5241 |
| | | 378/145 |
| 2016/0174921 A1 | 6/2016 | Wikler |

FOREIGN PATENT DOCUMENTS

| CN | 103040480 A | 4/2013 |
| CN | 103961119 A | 8/2014 |
| CN | 109223008 A | 1/2019 |
| CN | 111107788 A | 5/2020 |
| EP | 1004272 A1 | 5/2000 |

* cited by examiner

*Primary Examiner* — Edwin C Gunberg
(74) *Attorney, Agent, or Firm* — IPRO, PLLC; Qian Gu (57) ABSTRACT

Disclosed herein is a method, comprising sending radiation beam groups (i, j), i=1, . . . , M and j=1, . . . , Ni toward a same scene, wherein each radiation beam group comprises multiple parallel fan radiation beams sent simultaneously, wherein for each value of i, the radiation beam groups (i, j), j=1, . . . , Ni are parallel to each other and are sent one group at a time, and wherein no two radiation particle paths of two respective radiation beam groups with 2 different values of i are parallel to each other; for i=1, . . . , M and j=1, . . . , Ni, capturing with radiation of the radiation beam group (i, j) a partial image (i, j) of the scene; for each value of i, stitching the partial images (i, j), j=1, . . . , Ni; and reconstructing a 3-dimensional image of the scene from the stitched images (i), i=1, . . . , M.

20 Claims, 11 Drawing Sheets

810: sending radiation beam groups (i,j), i=1,...,M and j=1,...,Ni toward a same scene, wherein M and Ni, i=1,...,M are integers greater than 1,
wherein each radiation beam group of the radiation beam groups (i,j), i=1,...,M and j=1,...,Ni comprises multiple parallel fan radiation beams which are sent simultaneously,
wherein for each value of i, the fan radiation beams of the radiation beam groups (i,j), j=1,...,Ni are parallel to each other,
wherein for each value of i, the radiation beam groups (i,j), j=1,...,Ni are sent one group at a time, and
wherein for any different i1 and i2 of 1,...,M, no two radiation particle paths of the respective radiation beam groups (i1,j), j=1,...,Ni1 and radiation beam groups (i2,j), j=1,...,Ni2 of the radiation beam groups (i,j), i=1,...,M and j=1,...,Ni are parallel to each other.

820: for i=1,...,M and j=1,...,Ni, capturing with radiation of the radiation beam group (i,j) a partial image (i,j) of the scene.

830: for each value of i, stitching the partial images (i,j), j=1,...,Ni resulting in a stitched image (i) of the scene.

840: reconstructing a 3-dimensional image of the scene from the stitched images (i), i=1,...,M.

IMAGING METHODS USING MULTIPLE RADIATION BEAMS

BACKGROUND

A radiation detector is a device that measures a property of a radiation. Examples of the property may include a spatial distribution of the intensity, phase, and polarization of the radiation. The radiation may be one that has interacted with an object. For example, the radiation measured by the radiation detector may be a radiation that has penetrated the object. The radiation may be an electromagnetic radiation such as infrared light, visible light, ultraviolet light, X-ray, or y-ray. The radiation may be of other types such as a-rays and 3-rays. An imaging system may include an image sensor having multiple radiation detectors.

SUMMARY

Disclosed herein is a method, comprising sending radiation beam groups (i, j), i=1, . . . , M and j=1, . . . , Ni toward a same scene, wherein M and Ni, i=1, . . . , M are integers greater than 1, wherein each radiation beam group of the radiation beam groups (i, j), i=1, . . . , M and j=1, . . . , Ni comprises multiple parallel fan radiation beams which are sent simultaneously, wherein for each value of i, the fan radiation beams of the radiation beam groups (i, j), j=1, . . . , Ni are parallel to each other, wherein for each value of i, the radiation beam groups (i, j), j=1, . . . , Ni are sent one group at a time, and wherein for any different i1 and i2 of 1, . . . , M, no two radiation particle paths of the respective radiation beam groups (i1, j), j=1, . . . , Ni1 and radiation beam groups (i2, j), j=1, . . . , Ni2 of the radiation beam groups (i, j), i=1, . . . , M and j=1, . . . , Ni are parallel to each other; for i=1, . . . , M and j=1, . . . , Ni, capturing with radiation of the radiation beam group (i, j) a partial image (i, j) of the scene; for each value of i, stitching the partial images (i, j), j=1, . . . , Ni resulting in a stitched image (i) of the scene; and reconstructing a 3-dimensional image of the scene from the stitched images (i), i=1, . . . , M.

In an aspect, for each value of i, said sending the radiation beam groups (i, j), j=1, . . . , Ni toward the same scene comprises translating a same collimator (A) between a same radiation source and the scene and (B) in a normal direction (i) perpendicular to the radiation beam groups (i, j), j=1, . . . , Ni.

In an aspect, the collimator comprises multiple parallel slits which are configured to allow radiation of the radiation source that is incident on the multiple parallel slits and parallel to the multiple parallel slits to pass through the collimator.

In an aspect, the multiple parallel slits of the collimator are equally spaced.

In an aspect, for each value of i and for each value of j, as the partial image (i, j) is captured, any plane that (A) intersects any slit of the multiple parallel slits and (B) is parallel to any slit of the multiple parallel slits intersects the radiation source.

In an aspect, said sending comprises moving the collimator with respect to the scene while the radiation source is stationary with respect to scene.

In an aspect, said sending comprises moving the radiation source and the collimator with respect to the scene while the radiation source and the collimator are stationary with respect to each other.

In an aspect, said capturing is performed using an image sensor such that the radiation beam groups (i, j), i=1, . . . , M and j=1, . . . , Ni reach the scene before reaching the image sensor, and the image sensor comprises an active area that captures all the partial images (i, j), i=1, . . . , M and j=1, . . . , Ni.

In an aspect, all Ni, i=1, . . . , M are the same.

In an aspect, for each value of i, said stitching the partial images (i, j), j=1, . . . , Ni is based on relative positions of all fan radiation beams of the radiation beam groups (i, j), j=1, . . . , Ni with respect to each other.

Disclosed herein is an imaging system, comprising a radiation beam generator configured to send radiation beam groups (i, j), i=1, . . . , M and j=1, . . . , Ni toward a same scene, wherein M and Ni, i=1, . . . , M are integers greater than 1, wherein each radiation beam group of the radiation beam groups (i, j), i=1, . . . , M and j=1, . . . , Ni comprises multiple parallel fan radiation beams which are sent simultaneously, wherein for each value of i, the fan radiation beams of the radiation beam groups (i, j), j=1, . . . , Ni are parallel to each other, wherein for each value of i, the radiation beam groups (i, j), j=1, . . . , Ni are sent one group at a time, and wherein for any different i1 and i2 of 1, . . . , M, no two radiation particle paths of the respective radiation beam groups (i1, j), j=1, . . . , Ni1 and radiation beam groups (i2, j), j=1, . . . , Ni2 of the radiation beam groups (i, j), i=1, . . . , M and j=1, . . . , Ni are parallel to each other; and an image sensor configured to, for i=1, . . . , M and j=1, . . . , Ni, capture with radiation of the radiation beam group (i, j) a partial image (i, j) of the scene, for each value of i, stitch the partial images (i, j), j=1, . . . , Ni resulting in a stitched image (i) of the scene, and reconstruct a 3-dimensional image of the scene from the stitched images (i), i=1, . . . , M.

In an aspect, the radiation beam generator comprises a radiation source and a collimator, and for each value of i, the collimator is configured to be translated (A) between the radiation source and the scene and (B) in a normal direction (i) perpendicular to the radiation beam groups (i, j), j=1, . . . , Ni.

In an aspect, the collimator comprises multiple parallel slits which are configured to allow radiation of the radiation source that is incident on the multiple parallel slits and parallel to the multiple parallel slits to pass through the collimator.

In an aspect, the multiple parallel slits of the collimator are equally spaced.

In an aspect, for each value of i and for each value of j, as the image sensor captures the partial image (i, j), any plane that (A) intersects any slit of the multiple parallel slits and (B) is parallel to any slit of the multiple parallel slits intersects the radiation source.

In an aspect, the collimator is configured to move with respect to the scene while the radiation source is stationary with respect to scene.

In an aspect, the radiation source and the collimator are configured to move with respect to the scene while the radiation source and the collimator are stationary with respect to each other.

In an aspect, the image sensor comprises an active area configured to capture all the partial images (i, j), i=1, . . . , M and j=1, . . . , Ni.

In an aspect, all Ni, i=1, . . . , M are the same.

In an aspect, for each value of i, the image sensor is configured to stitch the partial images (i, j), j=1, . . . , Ni based on relative positions of all fan radiation beams of the radiation beam groups (i, j), j=1, . . . , Ni with respect to each other.

BRIEF DESCRIPTION OF FIGURES

FIG. 5A-FIG. 7C illustrate imaging sessions using the image sensor of FIG. 4, according to an embodiment.

DETAILED DESCRIPTION

Radiation Detector

Figure 1:
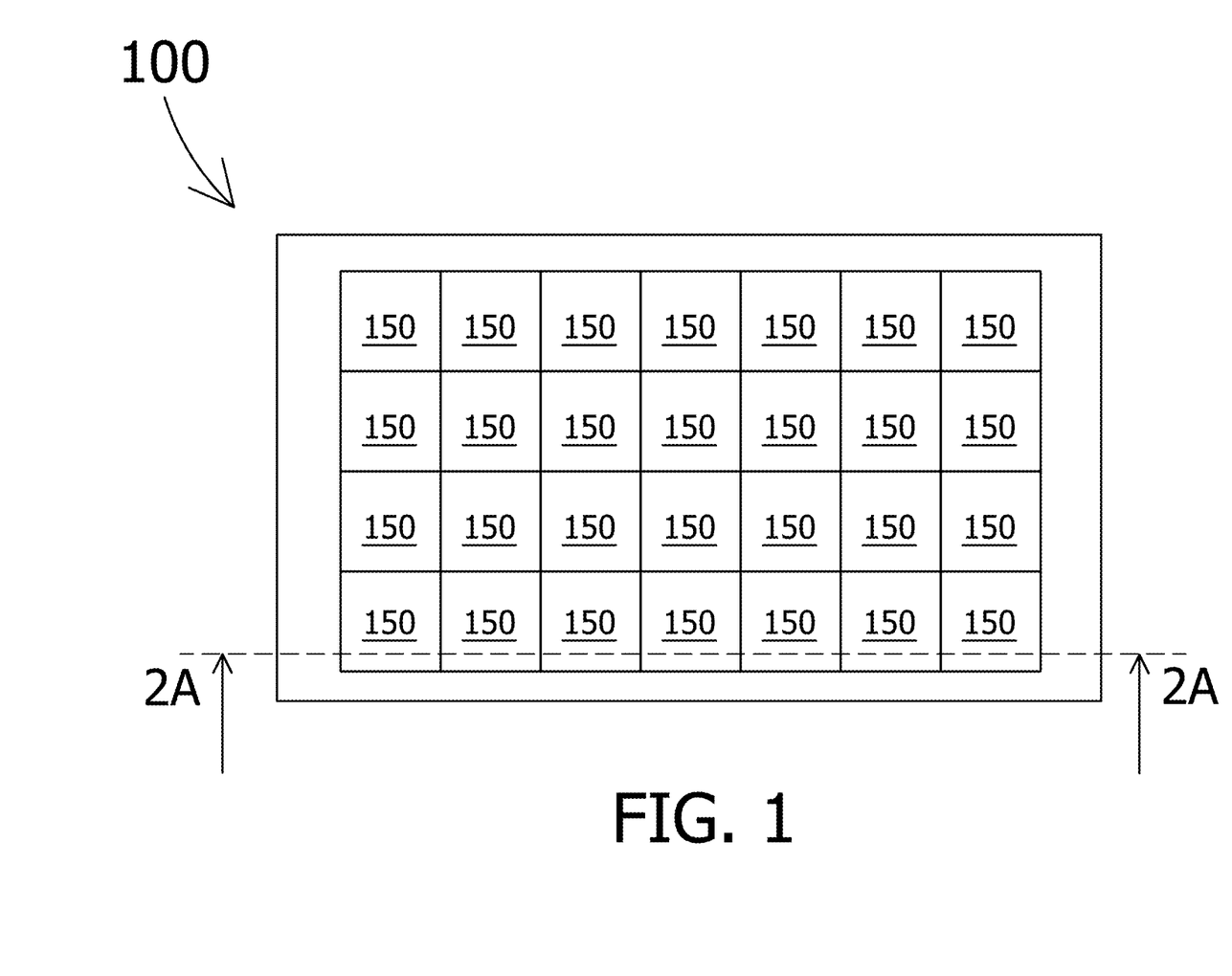
FIG. 1 schematically shows a radiation detector, according to an embodiment.

FIG. 1 schematically shows a radiation detector 100, as an example. The radiation detector 100 may include an array of pixels 150 (also referred to as sensing elements 150).

The array may be a rectangular array (as shown in FIG. 1), a honeycomb array, a hexagonal array, or any other suitable array. The array of pixels 150 in the example of FIG. 1 has 4 rows and 7 columns; however, in general, the array of pixels 150 may have any number of rows and any number of columns.

Each pixel 150 may be configured to detect radiation from a radiation source (not shown) incident thereon and may be configured to measure a characteristic (e.g., the energy of the particles, the wavelength, and the frequency) of the radiation. A radiation may include particles such as photons and subatomic particles. Each pixel 150 may be configured to count numbers of particles of radiation incident thereon whose energy falls in a plurality of bins of energy, within a period of time. All the pixels 150 may be configured to count the numbers of particles of radiation incident thereon within a plurality of bins of energy within the same period of time. When the incident particles of radiation have similar energy, the pixels 150 may be simply configured to count numbers of particles of radiation incident thereon within a period of time, without measuring the energy of the individual particles of radiation.

Each pixel 150 may have its own analog-to-digital converter (ADC) configured to digitize an analog signal representing the energy of an incident particle of radiation into a digital signal, or to digitize an analog signal representing the total energy of a plurality of incident particles of radiation into a digital signal. The pixels 150 may be configured to operate in parallel. For example, when one pixel 150 measures an incident particle of radiation, another pixel 150 may be waiting for a particle of radiation to arrive. The pixels 150 may not have to be individually addressable.

The radiation detector 100 described here may have applications such as in an X-ray telescope, X-ray mammography, industrial X-ray defect detection, X-ray microscopy or microradiography, X-ray casting inspection, X-ray non-destructive testing, X-ray weld inspection, X-ray digital subtraction angiography, etc. It may be suitable to use this radiation detector 100 in place of a photographic plate, a photographic film, a PSP plate, an X-ray image intensifier, a scintillator, or another semiconductor X-ray detector.

Figure 2A:
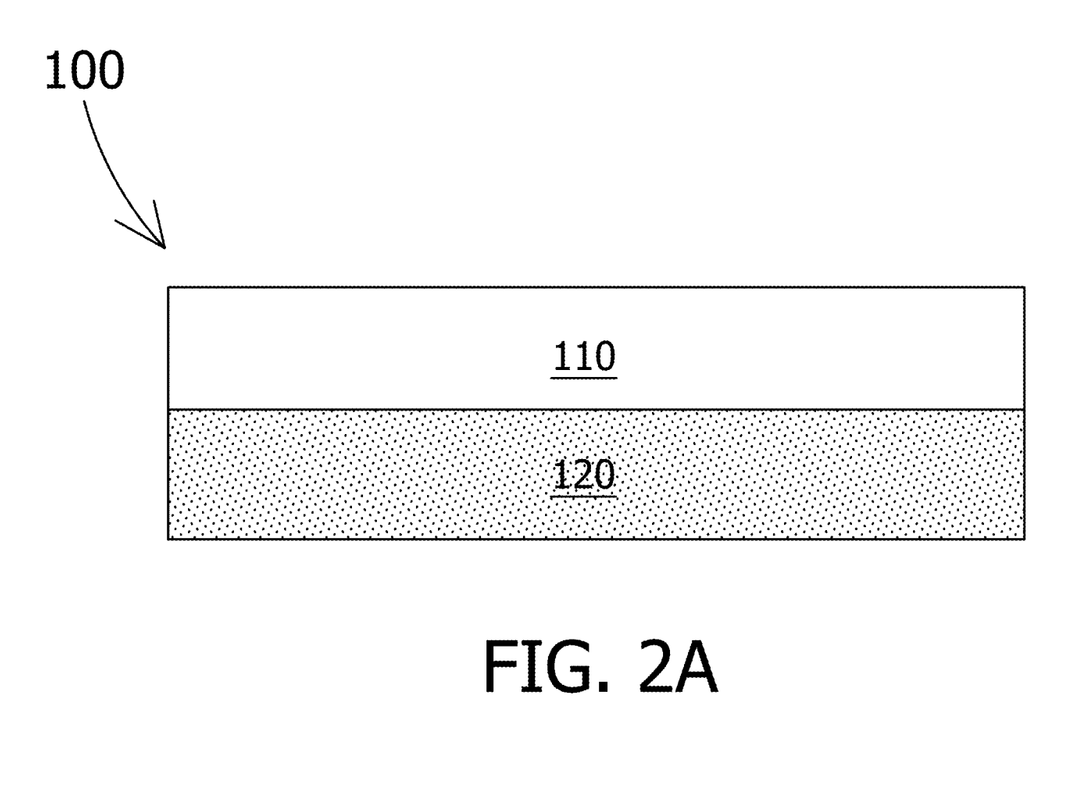
FIG. 2A schematically shows a simplified cross-sectional view of the radiation detector, according to an embodiment.

FIG. 2A schematically shows a simplified cross-sectional view of the radiation detector 100 of FIG. 1 along a line 2A-2A, according to an embodiment. Specifically, the radiation detector 100 may include a radiation absorption layer 110 and an electronics layer 120 (e.g., one or more ASICs or application-specific integrated circuits) for processing or analyzing electrical signals which incident radiation generates in the radiation absorption layer 110. The radiation detector 100 may or may not include a scintillator (not shown).

The radiation absorption layer 110 may include a semiconductor material such as silicon, germanium, GaAs, CdTe, CdZnTe, or a combination thereof. The semiconductor material may have a high mass attenuation coefficient for the radiation of interest.

Figure 2B:
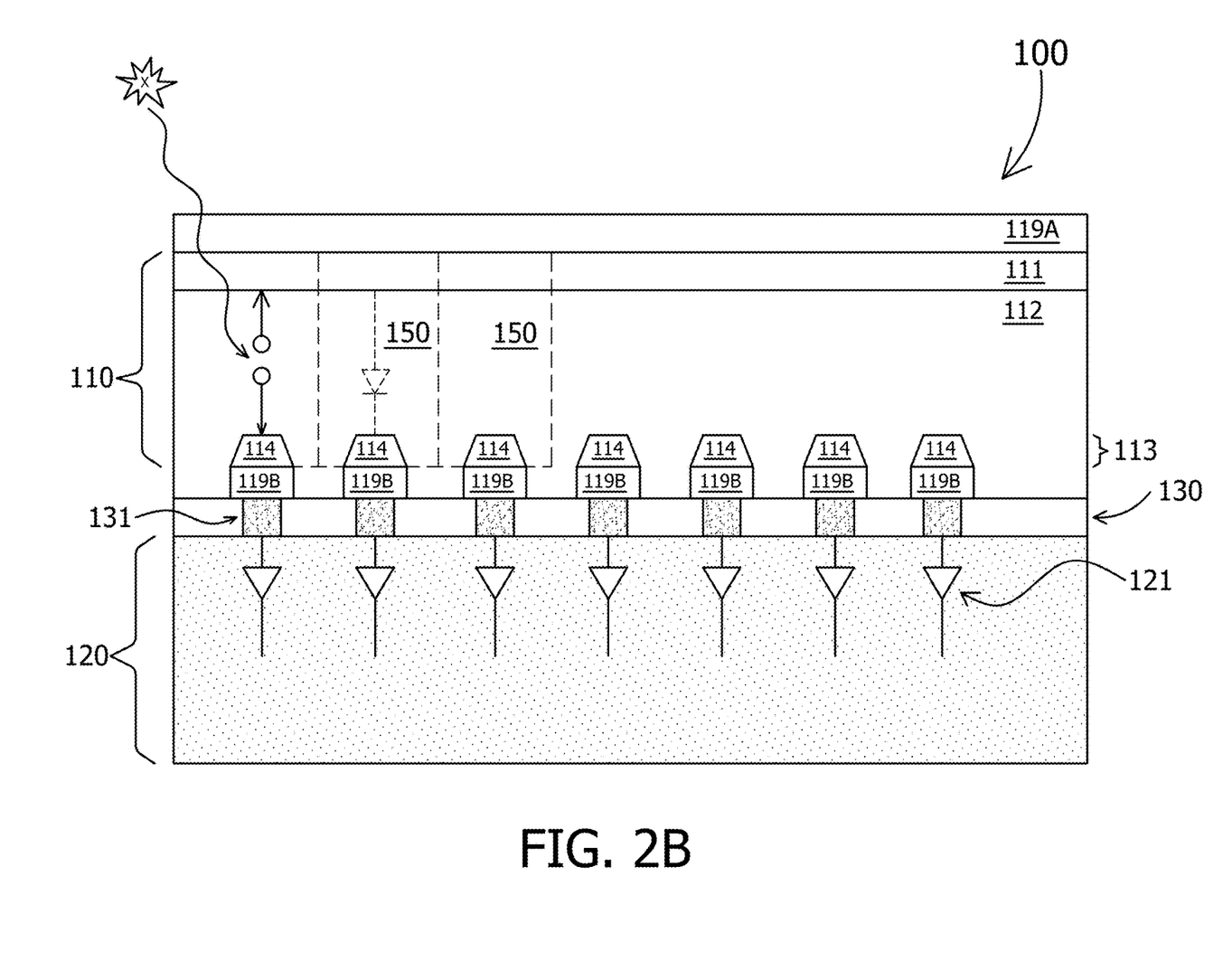
FIG. 2B schematically shows a detailed cross-sectional view of the radiation detector, according to an embodiment.

FIG. 2B schematically shows a detailed cross-sectional view of the radiation detector 100 of FIG. 1 along the line 2A-2A, as an example. Specifically, the radiation absorption layer 110 may include one or more diodes (e.g., p-i-n or p-n) formed by a first doped region 111, one or more discrete regions 114 of a second doped region 113. The second doped region 113 may be separated from the first doped region 111 by an optional intrinsic region 112.

The discrete regions 114 may be separated from one another by the first doped region 111 or the intrinsic region 112. The first doped region 111 and the second doped region 113 may have opposite types of doping (e.g., region 111 is p-type and region 113 is n-type, or region 111 is n-type and region 113 is p-type). In the example of FIG. 2B, each of the discrete regions 114 of the second doped region 113 forms a diode with the first doped region 111 and the optional intrinsic region 112. Namely, in the example in FIG. 2B, the radiation absorption layer 110 has a plurality of diodes (more specifically, 7 diodes corresponding to 7 pixels 150 of one row in the array of FIG. 1, of which only 2 pixels 150 are labeled in FIG. 2B for simplicity). The plurality of diodes may have an electrode 119A as a shared (common) electrode. The first doped region 111 may also have discrete portions.

The electronics layer 120 may include an electronic system 121 suitable for processing or interpreting signals generated by the radiation incident on the radiation absorption layer 110. The electronic system 121 may include an analog circuitry such as a filter network, amplifiers, integrators, and comparators, or a digital circuitry such as a microprocessor, and memory. The electronic system 121 may include one or more ADCs (analog to digital converters). The electronic system 121 may include components shared by the pixels 150 or components dedicated to a single pixel 150. For example, the electronic system 121 may include an amplifier dedicated to each pixel 150 and a microprocessor shared among all the pixels 150. The electronic system 121 may be electrically connected to the pixels 150 by vias 131. Space among the vias may be filled with a filler material 130, which may increase the mechanical stability of the connection of the electronics layer 120 to the radiation absorption layer 110. Other bonding techniques are possible to connect the electronic system 121 to the pixels 150 without using the vias 131.

When radiation from the radiation source (not shown) hits the radiation absorption layer 110 including diodes, particles of the radiation may be absorbed and generate one or more charge carriers (e.g., electrons, holes) by a number of mechanisms. The charge carriers may drift to the electrodes of one of the diodes under an electric field. The electric field may be an external electric field. The electrical contact 119B may include discrete portions each of which is in electrical contact with the discrete regions 114. The term "electrical contact" may be used interchangeably with the word "electrode." In an embodiment, the charge carriers may drift in directions such that the charge carriers generated by a single particle of the radiation are not substantially shared by two different discrete regions 114 ("not substantially shared" here means less than 2%, less than 0.5%, less than 0.1%, or less than 0.01% of these charge carriers flow to a different one of the discrete regions 114 than the rest of the charge carriers). Charge carriers generated by a particle of the radiation incident around the footprint of one of these discrete regions 114 are not substantially shared with another of these discrete regions 114. A pixel 150 associated with a discrete region 114 may be an area around the discrete region 114 in which substantially all (more than 98%, more than 99.5%, more than 99.9%, or more than 99.99% of) charge carriers generated by a particle of the radiation incident therein flow to the discrete region 114. Namely, less than 2%, less than 1%, less than 0.1%, or less than 0.01% of these charge carriers flow beyond the pixel 150.

Figure 2C:
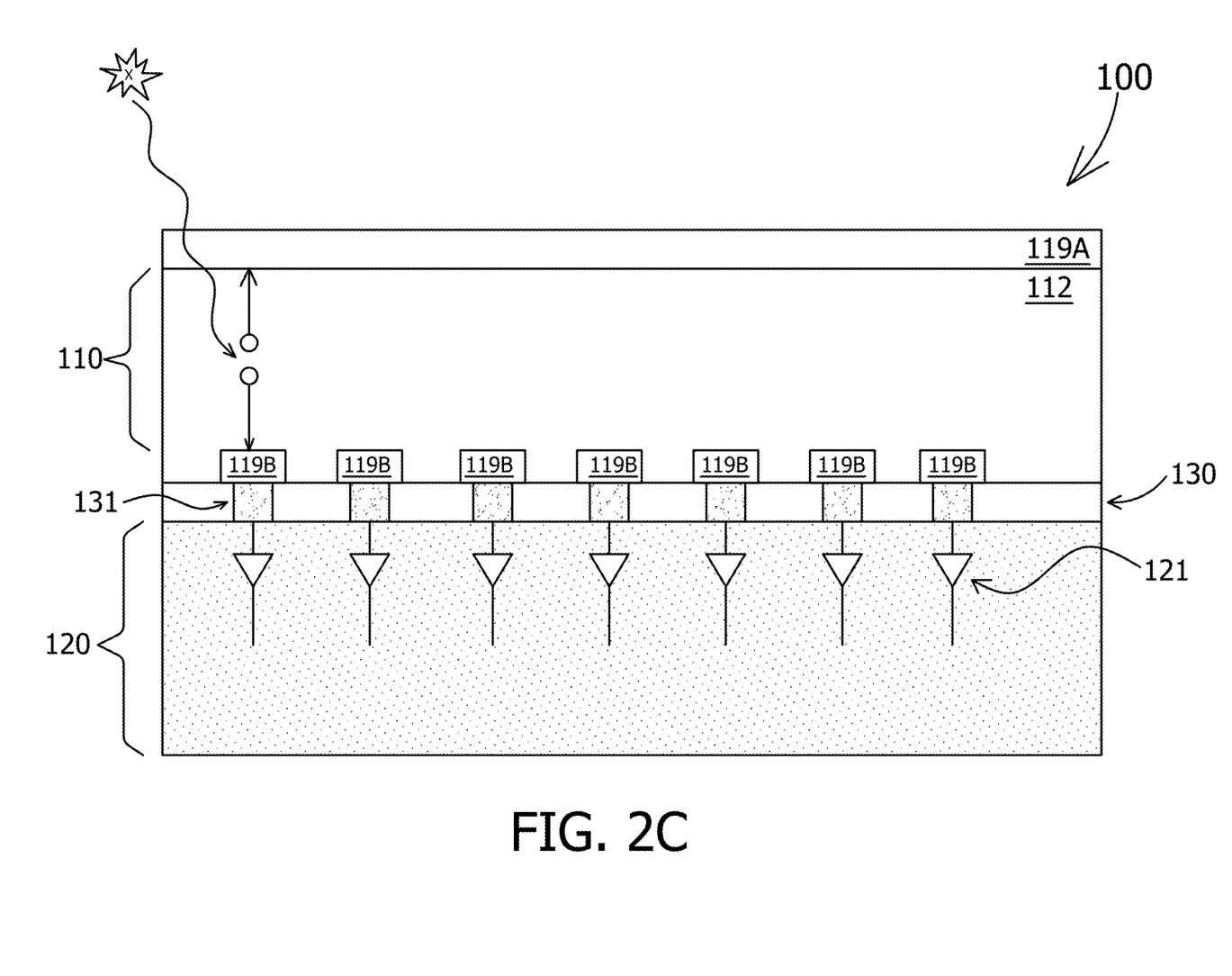
FIG. 2C schematically shows a detailed cross-sectional view of the radiation detector, according to an alternative embodiment.

FIG. 2C schematically shows a detailed cross-sectional view of the radiation detector 100 of FIG. 1 along the line 2A-2A, according to an alternative embodiment. More specifically, the radiation absorption layer 110 may include a resistor of a semiconductor material such as silicon, germanium, GaAs, CdTe, CdZnTe, or a combination thereof, but does not include a diode. The semiconductor material may have a high mass attenuation coefficient for the radiation of interest. In an embodiment, the electronics layer 120 of FIG. 2C is similar to the electronics layer 120 of FIG. 2B in terms of structure and function.

When the radiation hits the radiation absorption layer 110 including the resistor but not diodes, it may be absorbed and generate one or more charge carriers by a number of mechanisms. A particle of the radiation may generate 10 to 100,000 charge carriers. The charge carriers may drift to the electrical contacts 119A and 119B under an electric field. The electric field may be an external electric field. The electrical contact 119B may include discrete portions. In an embodiment, the charge carriers may drift in directions such that the charge carriers generated by a single particle of the radiation are not substantially shared by two different discrete portions of the electrical contact 119B ("not substantially shared" here means less than 2%, less than 0.5%, less than 0.1%, or less than 0.01% of these charge carriers flow to a different one of the discrete portions than the rest of the charge carriers). Charge carriers generated by a particle of the radiation incident around the footprint of one of these discrete portions of the electrical contact 119B are not substantially shared with another of these discrete portions of the electrical contact 119B. A pixel 150 associated with a discrete portion of the electrical contact 119B may be an area around the discrete portion in which substantially all (more than 98%, more than 99.5%, more than 99.9% or more than 99.99% of) charge carriers generated by a particle of the radiation incident therein flow to the discrete portion of the electrical contact 119B. Namely, less than 2%, less than 0.5%, less than 0.1%, or less than 0.01% of these charge carriers flow beyond the pixel associated with the one discrete portion of the electrical contact 119B.

Radiation Detector Package

Figure 3:
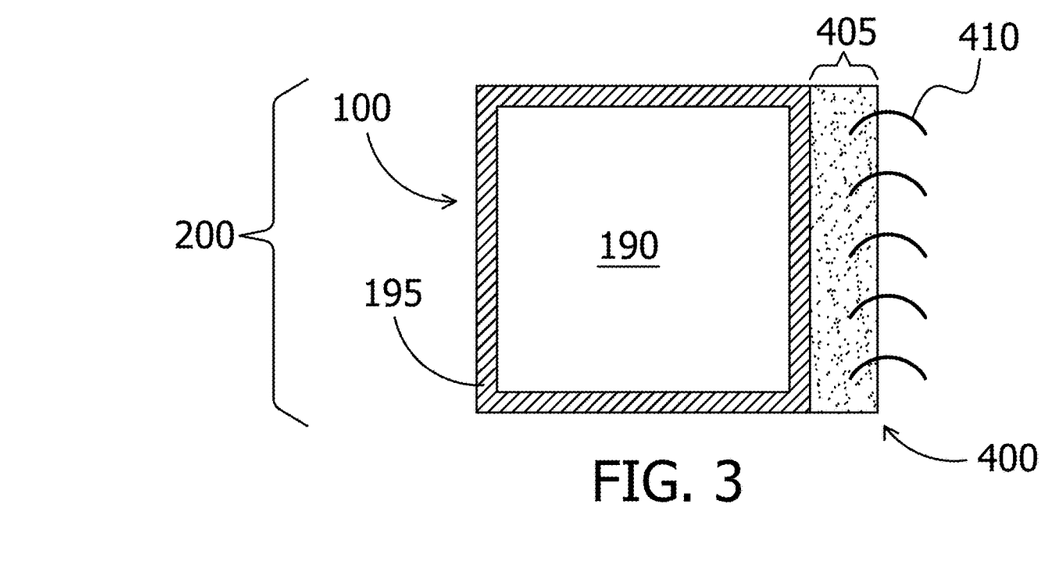
FIG. 3 schematically shows a top view of a package including the radiation detector and a printed circuit board (PCB), according to an embodiment.

FIG. 3 schematically shows a top view of a package 200 including the radiation detector 100 and a printed circuit board (PCB) 400. The term "PCB" as used herein is not limited to a particular material. For example, a PCB may include a semiconductor. The radiation detector 100 may be mounted to the PCB 400. The wiring between the radiation detector 100 and the PCB 400 is not shown for the sake of clarity. The PCB 400 may have one or more radiation detectors 100. The PCB 400 may have an area 405 not covered by the radiation detector 100 (e.g., for accommodating bonding wires 410). The radiation detector 100 may have an active area 190 which is where the pixels 150 (FIG. 1) are located.

The radiation detector 100 may have a perimeter zone 195 near the edges of the radiation detector 100. The perimeter zone 195 has no pixels 150, and the radiation detector 100 does not detect particles of radiation incident on the perimeter zone 195.

Image Sensor

Figure 4:
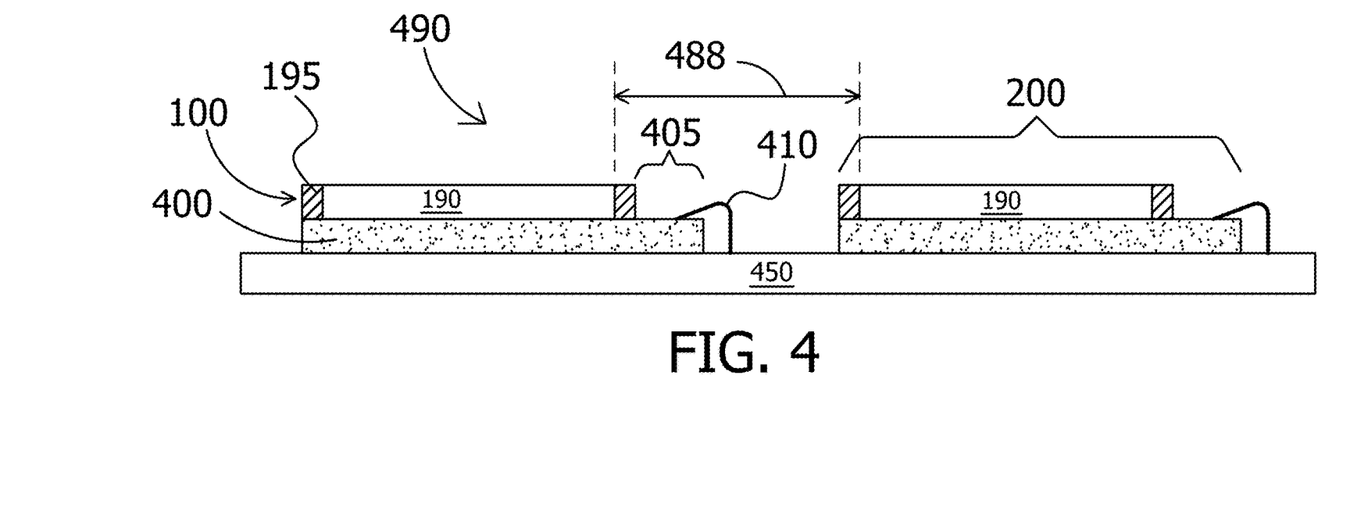
FIG. 4 schematically shows a cross-sectional view of an image sensor including the packages of FIG. 3 mounted to a system PCB (printed circuit board), according to an embodiment.

FIG. 4 schematically shows a cross-sectional view of an image sensor 490, according to an embodiment. The image sensor 490 may include one or more packages 200 of FIG. 3 mounted to a system PCB 450. FIG. 4 shows 2 packages 200 as an example. The electrical connection between the PCBs 400 and the system PCB 450 may be made by bonding wires 410. In order to accommodate the bonding wires 410 on the PCB 400, the PCB 400 may have the area 405 not covered by the radiation detector 100. In order to accommodate the bonding wires 410 on the system PCB 450, the packages 200 may have gaps in between. The gaps may be approximately 1 mm or more. Particles of radiation incident on the perimeter zones 195, on the area 405, or on the gaps cannot be detected by the packages 200 on the system PCB 450. A dead zone of a radiation detector (e.g., the radiation detector 100) is the area of the radiation-receiving surface of the radiation detector, on which incident particles of radiation cannot be detected by the radiation detector. A dead zone of a package (e.g., package 200) is the area of the radiation-receiving surface of the package, on which incident particles of radiation cannot be detected by the radiation detector or detectors in the package. In this example shown in FIG. 3 and FIG. 4, the dead zone of the package 200 includes the perimeter zones 195 and the area 405. A dead zone (e.g., 488) of an image sensor (e.g., image sensor 490) with a group of packages (e.g., packages 200 mounted on the same PCB and arranged in the same layer or in different layers) includes the combination of the dead zones of the packages in the group and the gaps between the packages. In an embodiment, the package 200 itself (FIG. 3) may be considered an image sensor.

The image sensor 490 including the radiation detectors 100 may have the dead zone 488 incapable of detecting incident radiation. However, the image sensor 490 may capture multiple partial images of an object or scene (not shown), and then these captured partial images may be stitched to form an image of the entire object or scene.

Imaging System—Initial Arrangement

Figure 5A:
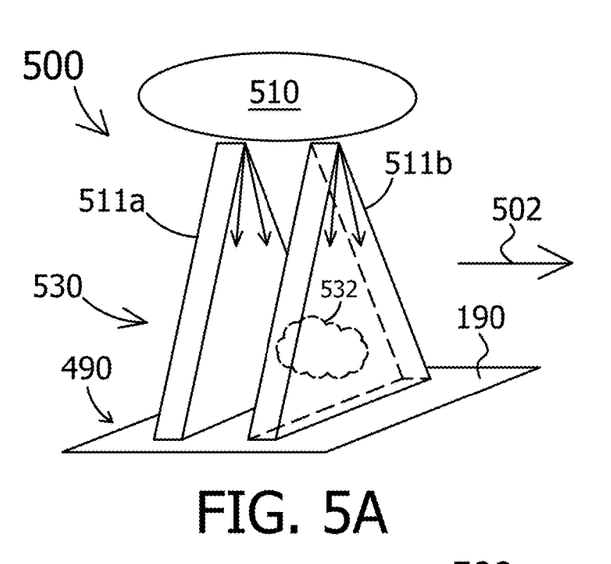

FIG. 5A schematically shows a perspective view of an imaging system 500, according to an embodiment. In an embodiment, the imaging system 500 may include a radiation beam generator 510 and the image sensor 490. For the image sensor 490, only an active area 190 of the image sensor 490 is shown for simplicity. In an embodiment, an object 532 may be positioned in a scene 530 between the radiation beam generator 510 and the image sensor 490.

First Partial Image Capture

In an embodiment, a first imaging session using the image sensor 490 to image the scene 530 (including the object 532) may start with a first partial image capture as follows. While the imaging system 500 is in a first system arrangement as shown in FIG. 5A, the radiation beam generator 510 may send 2 radiation fan beams 511a and 511b simultaneously toward the scene 530. In an embodiment, the 2 radiation fan beams 511a and 511b may parallel to each other as shown in FIG. 5A.

In an embodiment, the 2 radiation fan beams 511a and 511b after passing through the scene 530 including the object 532 may fall entirely on the active area 190. Using this incident radiation of the 2 radiation fan beams 511a and 511b, the active area 190 of the image sensor 490 may capture a first partial image 611 (FIG. 6A) of the scene 530.

Figure 6A:
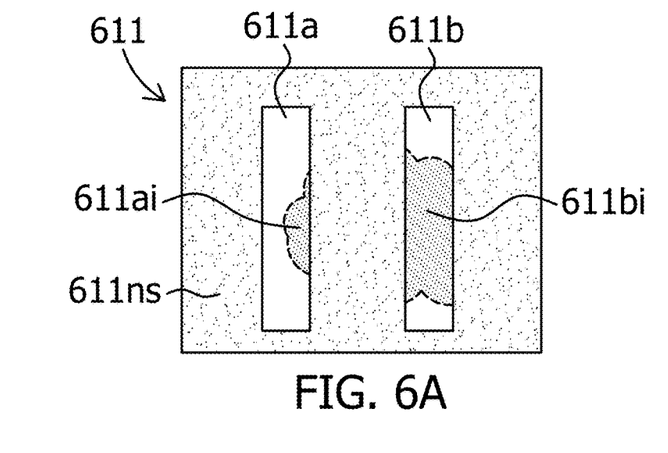

With reference to FIG. 5A and FIG. 6A, the first partial image 611 of the scene 530 may include (A) a non-signal region 611ns which may include, in an embodiment, picture elements corresponding to the pixels 150 of the active area 190 which do not receive incident radiation of the radiation fan beams 511a and 511b, and (B) 2 signal areas 611a and 611b which may include, in an embodiment, picture elements corresponding to the pixels 150 of the active area 190 which receive incident radiation of the radiation fan beams 511a and 511b (in other words, the signal areas 611a and 611b are the images of the radiation fan beams 511a and 511b respectively). The 2 signal areas 611a and 611b include partial images 611ai and 611bi of the object 532, respectively.

Second Partial Image Capture

Figure 5B:
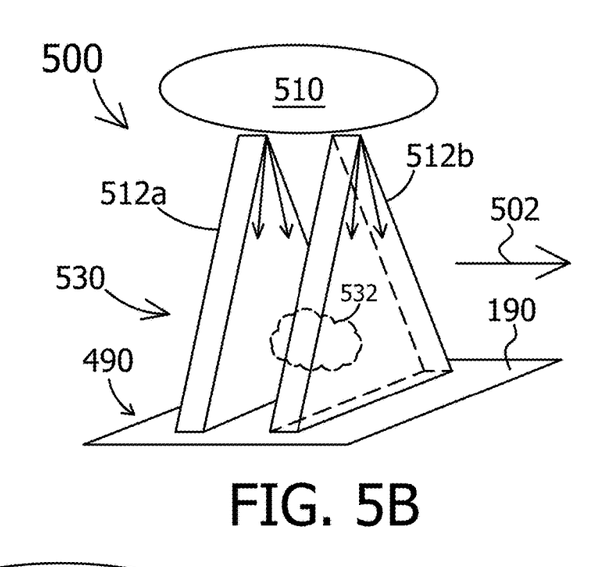

In an embodiment, after the active area 190 of the image sensor 490 captures the first partial image 611, the imaging system 500 may be transitioned to a second system arrangement as shown in FIG. 5B and then a second partial image capture of the first imaging session may proceed as follows. Specifically, with reference to FIG. 5B, while the imaging system 500 is in the second system arrangement, the radiation beam generator 510 may send 2 radiation fan beams 512a and 512b simultaneously toward the scene 530. In an embodiment, the 2 radiation fan beams 512a and 512b may be parallel to each other and parallel to the radiation fan beams 511a and 511b (FIG. 5A).

In an embodiment, the 2 radiation fan beams 512a and 512b may illuminate different parts of the scene 530 than the 2 radiation fan beams 511a and 511b do. In an embodiment, it is as if the 2 radiation fan beams 511a and 511b and the image sensor 490 of FIG. 5A were translated (i.e., every point is moved in the same direction and by the same distance) as a single object in a normal direction 502 (FIG. 5A) perpendicular to 2 radiation fan beams 511a and 511b and then become the 2 radiation fan beams 512a and 512b and the image sensor 490 of FIG. 5B respectively.

In an embodiment, the 2 radiation fan beams 512a and 512b after passing through the scene 530 including the object 532 may fall entirely on the active area 190. Using this incident radiation of the 2 radiation fan beams 512a and 512b, the active area 190 of the image sensor 490 may capture a second partial image 612 (FIG. 6B) of the scene 530.

Figure 6B:
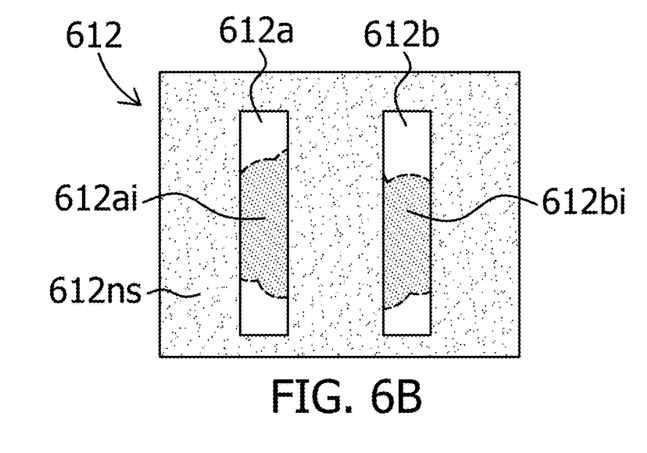

With reference to FIG. 5B and FIG. 6B, the second partial image 612 of the scene 530 may include (A) a non-signal region 612ns which may include, in an embodiment, picture elements corresponding to the pixels 150 of the active area 190 which do not receive incident radiation of the radiation fan beams 512a and 512b, and (B) 2 signal areas 612a and 612b which may include, in an embodiment, picture elements corresponding to the pixels 150 of the active area 190 which receive incident radiation of the radiation fan beams 512a and 512b (in other words, the signal areas 612a and 612b are the images of the radiation fan beams 512a and 512b respectively). The 2 signal areas 612a and 612b include partial images 612ai and 612bi of the object 532, respectively.

Third Partial Image Capture

Figure 5C:
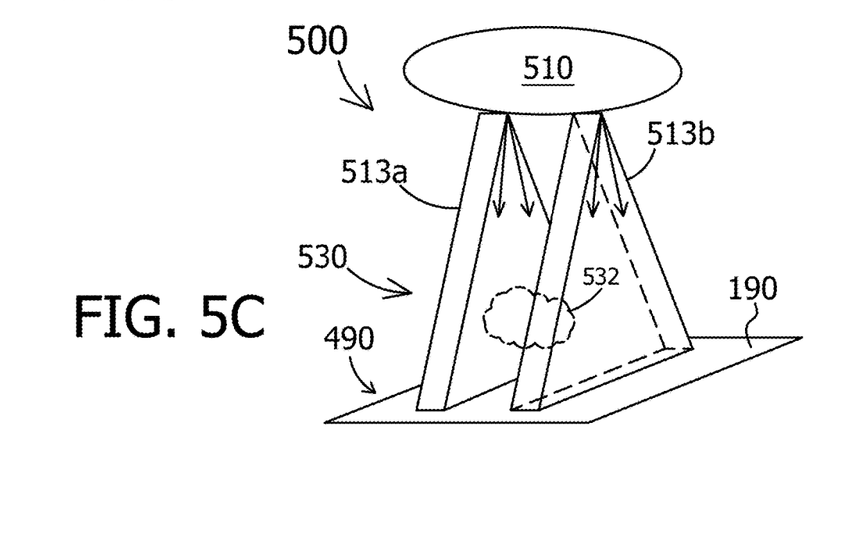

In an embodiment, after the active area 190 of the image sensor 490 captures the second partial image 612, the imaging system 500 may be transitioned to a third system arrangement as shown in FIG. 5C and then a third partial image capture of the first imaging session may proceed as follows. Specifically, in an embodiment, with reference to FIG. 5C, while the imaging system 500 is in the third system arrangement, the radiation beam generator 510 may send 2 radiation fan beams 513a and 513b simultaneously toward the scene 530. In an embodiment, the 2 radiation fan beams 513a and 513b may be parallel to each other and parallel to the radiation fan beams 512a and 512b (FIG. 5B).

In an embodiment, the 2 radiation fan beams 513a and 513b may illuminate different parts of the scene 530 than the radiation fan beams 511a, 511b, 512a, and 512b do. In an embodiment, it is as if the 2 radiation fan beams 512a and 512b and the image sensor 490 of FIG. 5B were translated as a single object in the normal direction 502 perpendicular to 2 radiation fan beams 512a and 512b and then become the 2 radiation fan beams 513a and 513b and the image sensor 490 of FIG. 5C respectively.

In an embodiment, the 2 radiation fan beams 513a and 513b after passing through the scene 530 including the object 532 may fall entirely on the active area 190. Using this incident radiation of the 2 radiation fan beams 513a and 513b, the active area 190 of the image sensor 490 may capture a third partial image 613 (FIG. 6C) of the scene 530.

Figure 6C:
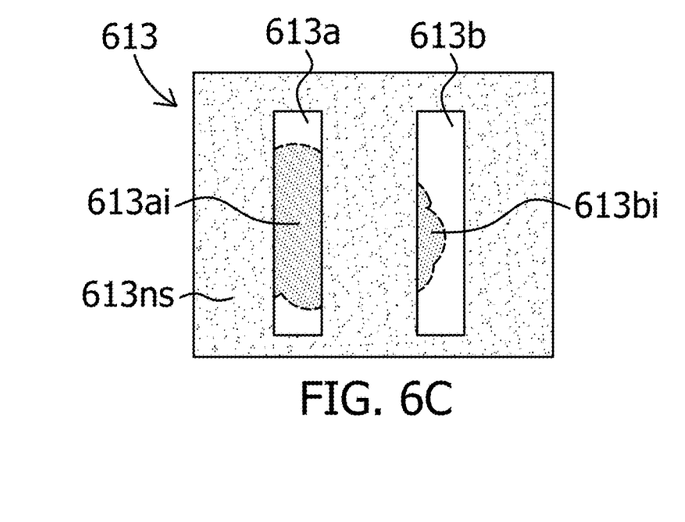
Figure 6D:
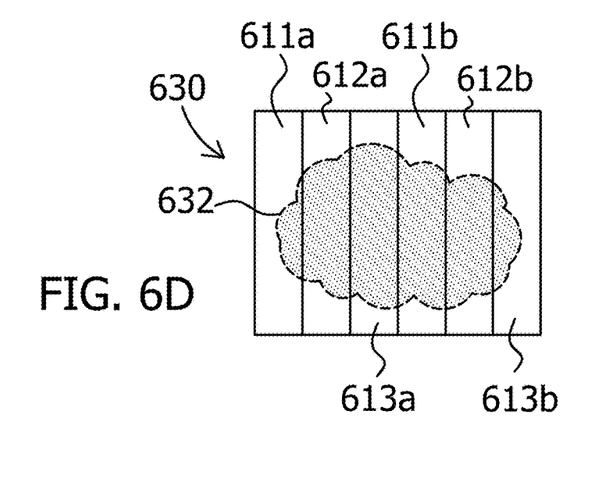

With reference to FIG. 5C and FIG. 6C, the third partial image 613 of the scene 530 may include (A) a non-signal region 613ns which may include, in an embodiment, picture elements corresponding to the pixels 150 of the active area 190 which do not receive incident radiation of the radiation fan beams 513a and 513b, and (B) 2 signal areas 613a and 613b which may include, in an embodiment, picture elements corresponding to the pixels 150 of the active area 190 which receive incident radiation of the radiation fan beams 513a and 513b (in other words, the signal areas 613a and 613b are the images of the radiation fan beams 513a and 513b respectively). The 2 signal areas 613a and 613b include partial images 613ai and 613bi of the object 532, respectively.

Stitching Partial Images

In an embodiment, with reference to FIG. 5A-FIG. 6D, after the active area 190 of the image sensor 490 captures the third partial image 613 of the scene 530, the image sensor 490 may stitch the 3 partial images 611, 612, and 613 resulting in a first stitched image 630 (FIG. 6D) of the scene 530. The first stitched image 630 includes a stitched image 632 of the object 532.

In an embodiment, the stitching of the 3 partial images 611, 612, and 613 may be performed as follows. Firstly, the image sensor 490 may determine (A) the signal areas 611a and 611b (FIG. 6A) of the first partial image 611, (B) the signal areas 612a and 612b (FIG. 6B) of the second partial image 612, and (C) the signal areas 613a and 613b (FIG. 6C) of the third partial image 613. To determine a signal area of a partial image is to determine all the picture elements of the signal area. In an embodiment, determining a signal area of a partial image may include determining some or all picture elements on a border line of the signal area. In an embodiment, determining a picture element on the border line of the signal area may include analyzing the picture elements near the border line. When crossing the border line, the signal values of the picture elements should change abruptly, and this phenomenon should help with choosing a picture element to be the picture element on the border line.

Next, in an embodiment, after determining the signal areas 611*a*, 611*b*, 612*a*, 612*b*, 613*a*, and 613*b*, the image sensor 490 may align the determined signal areas 611*a*, 611*b*, 612*a*, 612*b*, 613*a*, and 613*b* to form the first stitched image 630 (FIG. 6D) of the scene 530. In an embodiment, the alignment of the signal areas 611*a*, 611*b*, 612*a*, 612*b*, 613*a*, and 613*b* mentioned above may be based on the relative positions of the radiation fan beams 511*a*, 511*b*, 512*a*, 512*b*, 513*a*, and 513*b* with respect to each other.

Repeat at a Different Angle

In an embodiment, after the third partial image 613 is captured, a second imaging session similar to the first imaging session may be performed, but at a different angle. Here, "at a different angle" means there do not exist (A) a first radiation particle path of the radiation fan beams used in the first imaging session, and (B) a second radiation particle path of the radiation fan beams used in the second imaging session, such that the first radiation particle path and the second radiation particle path are parallel to each other. A radiation particle path belongs to a radiation beam if at least a radiation particle of the radiation beam follows or propagates along that radiation particle path.

Figure 7A:
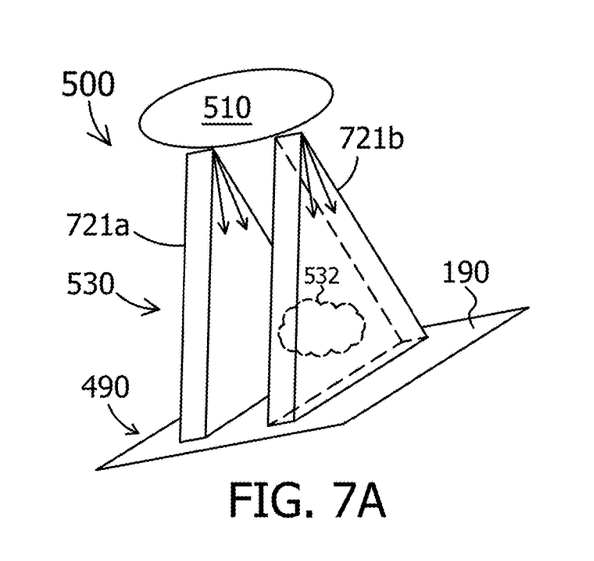

In an embodiment, the second imaging session may include fourth, fifth, and sixth partial image captures which are respectively similar to the first, second, and third partial image captures of the first imaging session described above. More specifically, in an embodiment, during the fourth partial image capture of the second imaging session, the radiation beam generator 510 may generate 2 parallel radiation fan beams 721*a* and 721*b* simultaneously (FIG. 7A). Using radiation of the 2 radiation fan beams 721*a* and 721*b* that has passed through the scene 530, the active area 190 of the image sensor 490 may capture a fourth partial image (not shown) of the scene 530.

Next, in an embodiment, during the fifth partial image capture of the second imaging session, the radiation beam generator 510 may generate 2 parallel radiation fan beams 722*a* and 722*b* simultaneously (FIG. 7B) which are parallel to the 2 parallel radiation fan beams 721*a* and 721*b* (FIG. 7A). Using radiation of the 2 radiation fan beams 722*a* and 722*b* that has passed through the scene 530, the active area 190 of the image sensor 490 may capture a fifth partial image (not shown) of the scene 530.

Figure 7B:
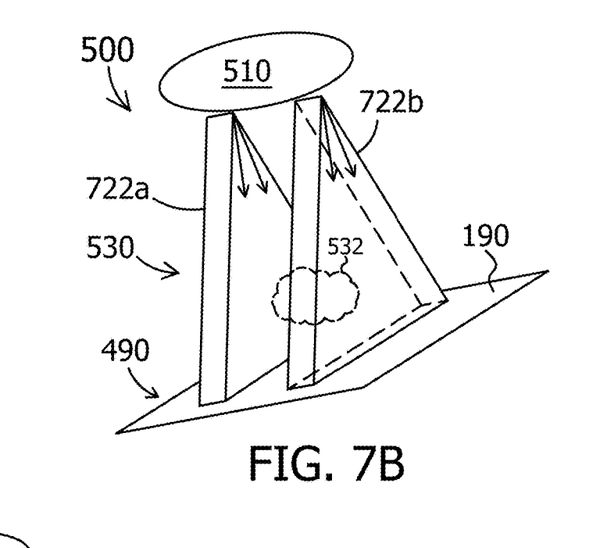
Figure 7C:
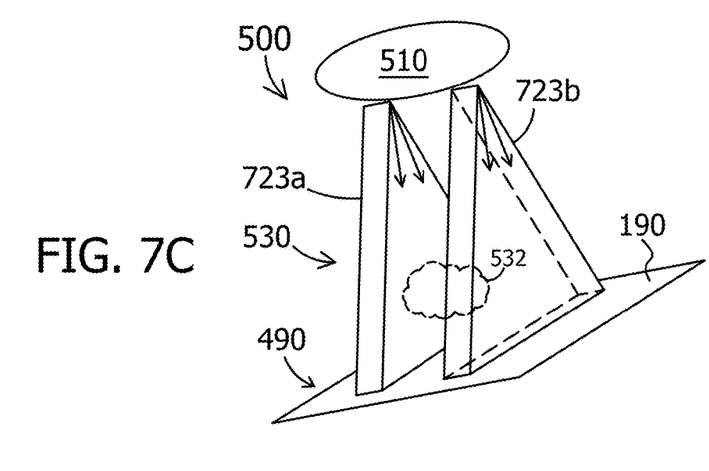

Next, in an embodiment, during the sixth partial image capture of the second imaging session, the radiation beam generator 510 may generate 2 parallel radiation fan beams 723*a* and 723*b* simultaneously (FIG. 7C) which are parallel to the 2 parallel radiation fan beams 722*a* and 722*b* (FIG. 7B). Using radiation of the 2 radiation fan beams 723*a* and 723*b* that has passed through the scene 530, the active area 190 of the image sensor 490 may capture a sixth partial image (not shown) of the scene 530.

Next, in an embodiment, the image sensor 490 may stitch the fourth, fifth, and sixth partial images of the scene 530 resulting in a second stitched image of the scene 530. In an embodiment, the stitching of the fourth, fifth, and sixth partial images of the scene 530 may be similar to the stitching of the first, second, and third partial images (611, 612, and 613 respectively) of the scene 530 described above.

3D Image Reconstruction

Next, in an embodiment, the image sensor 490 may reconstruct a 3-dimensional image of the scene 530 from the first stitched image 630 (FIG. 6D) and the second stitched image (not shown).

Generalization

Figure 8:
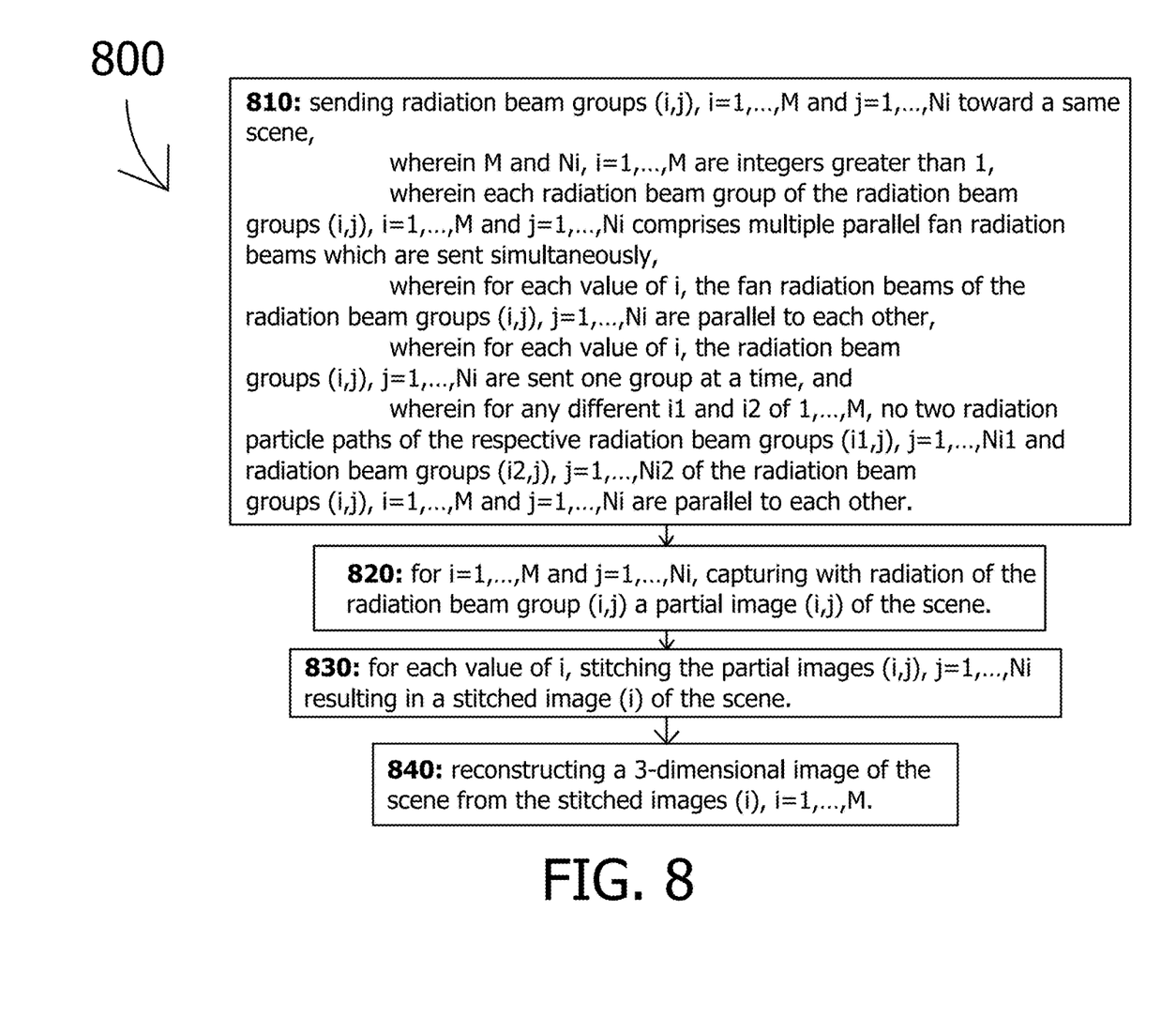
FIG. 8 shows a flowchart generalizing the imaging sessions.

FIG. 8 shows a flowchart 800 generalizing the operation of the imaging system 500 described above. In step 810, radiation beam groups (i, j), i=1, . . . , M and j=1, . . . , Ni are sent toward a same scene, wherein M and Ni, i=1, . . . , M are integers greater than 1. For example, M=2, N1=N2=3 in the embodiments described above. Specifically, the radiation beam groups (1,1), (1,2), (1,3), (2,1), (2,2), and (2,3) are radiation beam groups 511*a*+511*b*, 512*a*+512*b*, 513*a*+513*b*, 721*a*+721*b*, 722*a*+722*b*, and 723*a*+723*b*, respectively which are sent toward the same scene 530.

In addition, each radiation beam group of the radiation beam groups (i, j), i=1, . . . , M and j=1, . . . , Ni comprises multiple parallel fan radiation beams which are sent simultaneously. For example, the radiation beam group (1,1) includes 2 parallel fan radiation beams 511*a* and 511*b* (FIG. 5A) which are sent simultaneously. As another example, the radiation beam group (2,3) includes 2 parallel fan radiation beams 723*a* and 723*b* (FIG. 7C) which are sent simultaneously.

In addition, for each value of i, the fan radiation beams of the radiation beam groups (i, j), j=1, . . . , Ni are parallel to each other. For example, with M=2, and N1=N2=3 in the embodiments described above, for i=1, and j=1, 2, 3, the radiation fan beams 511*a*, 511*b*, 512*a*, 512*b*, 513*a*, and 513*b* are parallel to each other. For i=2, and j=1, 2, 3, the radiation fan beams 721*a*, 721*b*, 722*a*, 722*b*, 723*a*, and 723*b* are parallel to each other.

In addition, for each value of i, the radiation beam groups (i, j), j=1, . . . , Ni are sent one group at a time. For example, with M=2, and N1=N2=3 in the embodiments described above, for i=1, the radiation beam group 511*a*+511*b* (FIG. 5A), the radiation beam group 512*a*+512*b* (FIG. 5B), and the radiation beam group 513*a*+513*b* (FIG. 5C) are sent one group at a time. For i=2, the radiation beam group 721*a*+721*b* (FIG. 7A), the radiation beam group 722*a*+722*b* (FIG. 7B), and the radiation beam group 723*a*+723*b* (FIG. 7C) are sent one group at a time.

In addition, for any different i1 and i2 of 1, . . . , M, no two radiation particle paths of the respective radiation beam groups (i1, j), j=1, . . . , Ni1 and radiation beam groups (i2, j), j=1, . . . , Ni2 of the radiation beam groups (i, j), i=1, . . . , M and j=1, . . . , Ni are parallel to each other. For example, with M=2, and N1=N2=3 in the embodiments described above, and with i1=1 and i2=2, there are not (A) a first radiation particle path of the radiation fan beams 511*a*, 511*b*, 512*a*, 512*b*, 513*a*, and 513*b* (FIG. 5A-FIG. 5C) and (B) a second radiation particle path of the radiation fan beams 721*a*, 721*b*, 722*a*, 722*b*, 723*a*, and 723*b* (FIG. 7A-FIG. 7C) such that the first radiation particle path and the second radiation particle path are parallel to each other.

In step 820, for i=1, . . . , M and j=1, . . . , Ni, a partial image (i, j) of the scene is captured with radiation of the radiation beam group (i, j). For example, with i=1, and j=1, the partial image 611 (FIG. 6A) is captured with radiation of the radiation beam group (1,1) which includes the radiation fan beams 511*a* and 511*b* (FIG. 5A). As another example, with i=1, and j=2, the partial image 612 (FIG. 6B) is captured with radiation of the radiation beam group (1,2) which includes the radiation fan beams 512*a* and 512*b* (FIG. 5B).

In step 830, for each value of i, the partial images (i, j), j=1, ..., Ni are stitched resulting in a stitched image (i) of the scene. For example, with M=2, and N1=N2=3 in the embodiments described above, and for i=1, with reference to FIG. 6A-FIG. 6D, the partial images 611, 612, and 613 are stitched resulting in the first stitched image 630 of the scene 530. As another example, for i=2, the fourth, fifth, and sixth partial images (not shown) are stitched resulting in the second stitched image (not shown) of the scene 530.

In step 840, a 3-dimensional (3D) image of the scene is reconstructed from the stitched images (i), i=1, ..., M. For example, with M=2, and N1=N2=3 in the embodiments described above, a 3D image of the scene 530 is reconstructed from the first stitched image 630 (FIG. 6D) of the scene 530 and the second stitched image (not shown) of the scene 530 as described above.

Collimator

Figure 9:
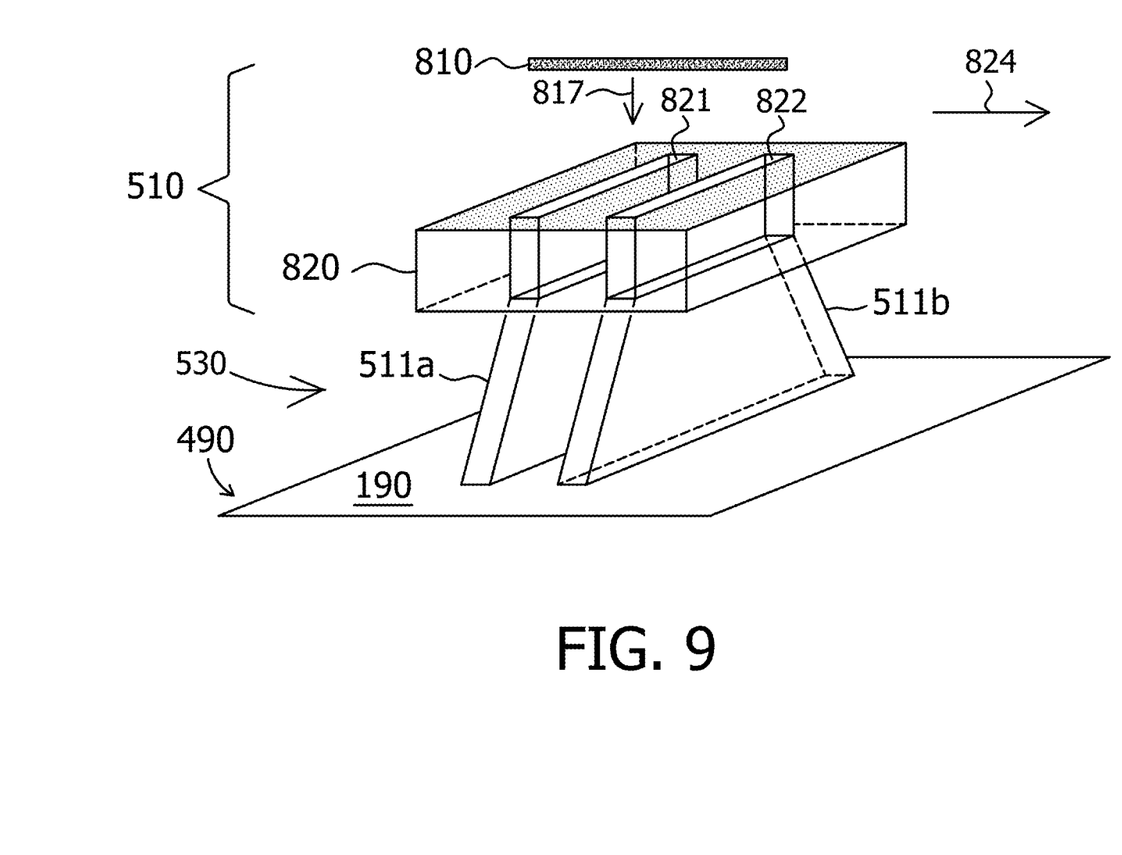
FIG. 9-FIG. 10 show how the radiation beams used in the imaging sessions are generated, according to different embodiments.

In an embodiment, with reference to FIG. 9, the radiation beam generator 510 may include a radiation source 810 and a collimator 820. In an embodiment, the collimator 820 may include 2 parallel slits 821 and 822. In an embodiment, the parallel radiation fan beams 511a and 511b of FIG. 5A may be generated as follows. Specifically, the radiation source 810 may send radiation 817 toward the collimator 820. In an embodiment, some portions of the radiation 817 incident on the 2 parallel slits 821 and 822 and parallel to the 2 parallel slits 821 and 822 may be allowed to pass through the collimator 820 resulting in the parallel radiation fan beams 511a and 511b respectively. In an embodiment, the radiation source 810 may include a metal rod bombarded by an electron beam (not shown).

In an embodiment, the parallel radiation fan beams 512a and 512b of FIG. 5B may be generated as follows. Firstly, the collimator 820 of FIG. 9 may be translated in a normal direction 824 perpendicular to the parallel radiation fan beams 511a and 511b to the next position in the second system arrangement. Then, in an embodiment, some portions of the radiation 817 incident on the 2 parallel slits 821 and 822 and parallel to the 2 parallel slits 821 and 822 may be allowed to pass through the collimator 820 resulting in the parallel radiation fan beams 512a and 512b. In an embodiment, the radiation source 810 may remain stationary with respect to the scene 530 as the collimator 820 is translated to its new position in the second system arrangement. In an alternative embodiment, the radiation source 810 and the collimator 820 may be translated as a single object in the normal direction 824 to their new positions in the second system arrangement.

In an embodiment, the parallel radiation fan beams 513a and 513b of FIG. 5C may be generated in a manner similar to the manner in which the parallel radiation fan beams 512a and 512b of FIG. 5B are generated.

In short, the generation of the parallel radiation fan beams 511a, 511b, 512a, 512b, 513a, and 513b may include translating the collimator 820 (A) in the radiation 817 from the radiation source 810, and (B) in the normal direction 824 perpendicular to all the parallel radiation fan beams 511a, 511b, 512a, 512b, 513a, and 513b. In an embodiment, the parallel radiation fan beams 721a, 721b, 722a, 722b, 723a, and 723b of FIG. 7A-FIG. 7C may be generated in a manner similar to the manner in which the parallel radiation fan beams 511a, 511b, 512a, 512b, 513a, and 513b are generated.

Figure 10:
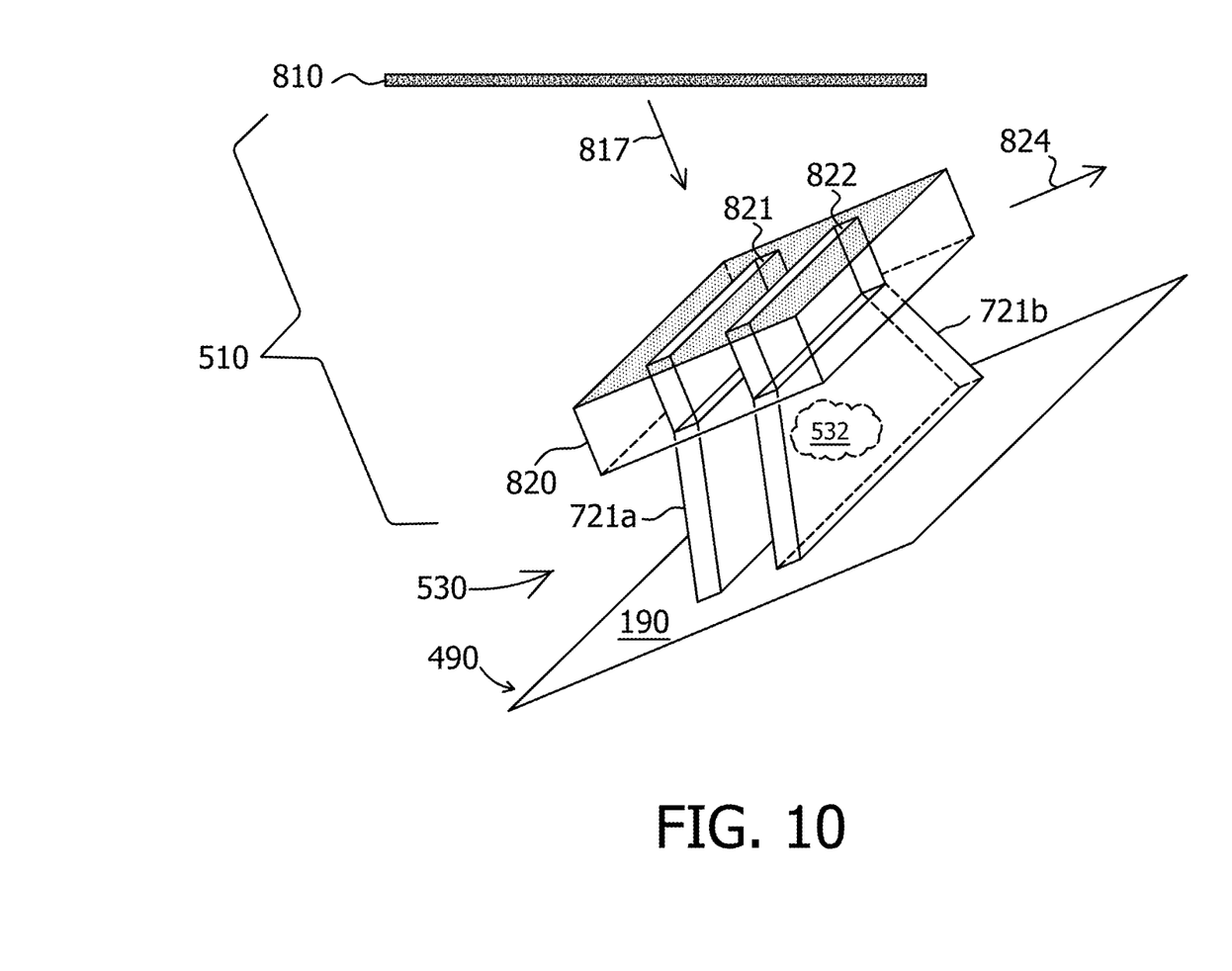

In an embodiment, the transition of the imaging system 500 from FIG. 5C to FIG. 7A may include rotating the imaging system 500 of FIG. 5C (including the radiation beam generator 510) around an axis that is parallel to (A) a plane that intersects all pixels 150 of the active area 190 of FIG. 5C and (B) the parallel radiation fan beams 511a, 511b, 512a, 512b, 513a, and 513b. In an alternative embodiment, with reference to FIG. 10, the rotation of the imaging system 500 described above does not apply to the radiation source 810 (i.e., the radiation source 810 remains stationary with respect to the scene 530). In an embodiment, with reference to FIG. 9 and FIG. 10, when the active area 190 captures any one of the first, second, third, fourth, fifth, and sixth partial images of the scene 530, any plane that (A) intersects any slit of the multiple parallel slits 821 and 822 and (B) is parallel to any slit of the multiple parallel slits 821 and 822 intersects the radiation source 810. For example, in FIG. 9, as the active area 190 captures the first partial image 611 of the scene 530 (FIG. 6A), the plane that intersects the slit 821 and is parallel to the slit 822 intersects the radiation source 810; and similarly, the plane that intersects the slit 822 and is parallel to the slit 821 intersects the radiation source 810. In other words, in FIG. 9, as the active area 190 captures the first partial image 611 of the scene 530 (FIG. 6A), the plane which the fan beam 511a is on intersects the radiation source 810; and similarly, the plane which the fan beam 511b is on intersects the radiation source 810.

In the embodiments described above, the collimator 820 has 2 parallel slits 821 and 822. In general, the collimator 820 may have multiple parallel slits (similar to the parallel slits 821 and 822). In an embodiment, these multiple parallel slits of the collimator 820 may be equally spaced (i.e., the distance between any two adjacent slits is the same).

Multiple Active Areas Involved

In the embodiments described above, one active area 190 captures all the partial images of the scene 530. In an alternative embodiment, two or more active areas 190 may capture the partial images of the scene 530. For an example of this alternative embodiment, the active area 190 of FIG. 5B (that captures the second partial image 612 of FIG. 6B) may be different than the active area 190 of FIG. 5A (that captures the first partial image 611 of FIG. 6A).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An imaging method, comprising:
   sending radiation beam groups (i, j), i=1, ..., M and j=1, ..., Ni toward a same scene,
   wherein M and Ni, i=1, ..., M are integers greater than 1,
   wherein each radiation beam group of the radiation beam groups (i, j), i=1, ..., M and j=1, ..., Ni comprises multiple parallel fan radiation beams which are sent simultaneously,
   wherein for each value of i, the fan radiation beams of the radiation beam groups (i, j), j=1, ..., Ni are parallel to each other,
   wherein for each value of i, the radiation beam groups (i, j), j=1, ..., Ni are sent one group at a time, and
   wherein for any different i1 and i2 of 1, ..., M, no two radiation particle paths of the respective radiation beam groups (i1, j), j=1, ..., Ni1 and radiation beam groups (i2, j), j=1, ..., Ni2 of the radiation beam groups (i, j), i=1, ..., M and j=1, ..., Ni are parallel to each other;
   for i=1, ..., M and j=1, ..., Ni, capturing with radiation of the radiation beam group (i, j) a partial image (i, j) of the scene;

for each value of i, stitching the partial images (i, j), j=1, ..., Ni resulting in a stitched image (i) of the scene; and reconstructing a 3-dimensional image of the scene from the stitched images (i), i=1, ..., M.

2. The imaging method of claim 1, wherein for each value of i, said sending the radiation beam groups (i, j), j=1, ..., Ni toward the same scene comprises translating a same collimator (A) between a same radiation source and the scene and (B) in a normal direction (i) perpendicular to the radiation beam groups (i, j), j=1, ..., Ni.

3. The imaging method of claim 2, wherein the collimator comprises multiple parallel slits which are configured to allow radiation of the radiation source that is incident on the multiple parallel slits and parallel to the multiple parallel slits to pass through the collimator.

4. The imaging method of claim 3, wherein the multiple parallel slits of the collimator are equally spaced.

5. The imaging method of claim 3, wherein for each value of i and for each value of j, as the partial image (i, j) is captured, any plane that (A) intersects any slit of the multiple parallel slits and (B) is parallel to any slit of the multiple parallel slits intersects the radiation source.

6. The imaging method of claim 2, wherein said sending comprises moving the collimator with respect to the scene while the radiation source is stationary with respect to scene.

7. The imaging method of claim 2, wherein said sending comprises moving the radiation source and the collimator with respect to the scene while the radiation source and the collimator are stationary with respect to each other.

8. The imaging method of claim 1,
wherein said capturing is performed using an image sensor such that the radiation beam groups (i, j), i=1, ..., M and j=1, ..., Ni reach the scene before reaching the image sensor, and
wherein the image sensor comprises an active area that captures all the partial images (i, j), i=1, ..., M and j=1, ..., Ni.

9. The imaging method of claim 1, wherein all Ni, i=1, ..., M are the same.

10. The imaging method of claim 1, wherein for each value of i, said stitching the partial images (i, j), j=1, ..., Ni is based on relative positions of all fan radiation beams of the radiation beam groups (i, j), j=1, ..., Ni with respect to each other.

11. An imaging system, comprising:
a radiation beam generator configured to send radiation beam groups (i, j), i=1, ..., M and j=1, ..., Ni toward a same scene,
wherein M and Ni, i=1, ..., M are integers greater than 1,
wherein each radiation beam group of the radiation beam groups (i, j), i=1, ..., M and j=1, ..., Ni comprises multiple parallel fan radiation beams which are sent simultaneously, wherein for each value of i, the fan radiation beams of the radiation beam groups (i, j), j=1, ..., Ni are parallel to each other, wherein for each value of i, the radiation beam groups (i, j), j=1, ..., Ni are sent one group at a time, and wherein for any different i1 and i2 of 1, ..., M, no two radiation particle paths of the respective radiation beam groups (i1, j), j=1, ..., Ni1 and radiation beam groups (i2, j), j=1, ..., Ni2 of the radiation beam groups (i, j), i=1, ..., M and j=1, ..., Ni are parallel to each other; and an image sensor configured to,
for i=1, ..., M and j=1, ..., Ni, capture with radiation of the radiation beam group (i, j) a partial image (i, j) of the scene, for each value of i, stitch the partial images (i, j), j=1, ..., Ni resulting in a stitched image (i) of the scene, and reconstruct a 3-dimensional image of the scene from the stitched images (i), i=1, ..., M.

12. The imaging system of claim 11,
wherein the radiation beam generator comprises a radiation source and a collimator, and
wherein for each value of i, the collimator is configured to be translated (A) between the radiation source and the scene and (B) in a normal direction (i) perpendicular to the radiation beam groups (i, j), j=1, ..., Ni.

13. The imaging system of claim 12, wherein the collimator comprises multiple parallel slits which are configured to allow radiation of the radiation source that is incident on the multiple parallel slits and parallel to the multiple parallel slits to pass through the collimator.

14. The imaging system of claim 13, wherein the multiple parallel slits of the collimator are equally spaced.

15. The imaging system of claim 13, wherein for each value of i and for each value of j, as the image sensor captures the partial image (i, j), any plane that (A) intersects any slit of the multiple parallel slits and (B) is parallel to any slit of the multiple parallel slits intersects the radiation source.

16. The imaging system of claim 12, wherein the collimator is configured to move with respect to the scene while the radiation source is stationary with respect to scene.

17. The imaging system of claim 12, wherein the radiation source and the collimator are configured to move with respect to the scene while the radiation source and the collimator are stationary with respect to each other.

18. The imaging system of claim 11, wherein the image sensor comprises an active area configured to capture all the partial images (i, j), i=1, ..., M and j=1, ..., Ni.

19. The imaging system of claim 11, wherein all Ni, i=1, ..., M are the same.

20. The imaging system of claim 11, wherein for each value of i, the image sensor is configured to stitch the partial images (i, j), j=1, ..., Ni based on relative positions of all fan radiation beams of the radiation beam groups (i, j), j=1, ..., Ni with respect to each other.

* * * * *